(12) United States Patent
Wendt

(10) Patent No.: US 11,946,588 B2
(45) Date of Patent: Apr. 2, 2024

(54) DISPLAY COUNTERBALANCE MECHANISM

(71) Applicant: Microsoft Technology Licensing, LLC, Redmond, WA (US)

(72) Inventor: Nicholas Benjamin Wendt, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/753,605

(22) PCT Filed: Sep. 9, 2020

(86) PCT No.: PCT/US2020/049841
§ 371 (c)(1),
(2) Date: Mar. 9, 2022

(87) PCT Pub. No.: WO2021/055192
PCT Pub. Date: Mar. 25, 2021

(65) Prior Publication Data
US 2022/0373127 A1 Nov. 24, 2022

(30) Foreign Application Priority Data
Sep. 18, 2019 (NL) .................................... 2023844

(51) Int. Cl.
*F16M 11/00* (2006.01)
*F16M 11/10* (2006.01)
(52) U.S. Cl.
CPC ..... *F16M 11/105* (2013.01); *F16M 2200/041* (2013.01); *F16M 2200/066* (2013.01)

(58) Field of Classification Search
CPC ............. H04M 1/0233; H04M 1/0212; H04M 1/0227; F16M 2200/024; F16M 11/10;
(Continued)

(56) References Cited

U.S. PATENT DOCUMENTS

| 5,027,473 A | 7/1991 | Hottmann |
| 7,869,840 B2 * | 1/2011 | Kim ................... H04M 1/0233 455/90.3 |

(Continued)

FOREIGN PATENT DOCUMENTS

| CN | 1251646 A | 4/2000 |
| CN | 102767678 A | 11/2012 |

(Continued)

OTHER PUBLICATIONS https://www.merriam-webster.com/dictionary/translate.*
(Continued)

*Primary Examiner* — Christopher Garft
(74) *Attorney, Agent, or Firm* — Alleman Hall & Tuttle LLP

(57) ABSTRACT

Examples are disclosed that relate to display assemblies and counterbalance mechanisms for rotatable displays. In one example, a counterbalance mechanism for a rotatable display comprises at least one crank arm rotatably connected to a ground. The counterbalance mechanism also comprises at least one spring comprising a first end connected to a spring end of the at least one crank arm, and a second end connected to the ground. At least one connecting link has a first portion connected to the at least one crank arm and a second portion connected to the rotatable display.

19 Claims, 14 Drawing Sheets

(58) Field of Classification Search
CPC ......... F16M 11/2021; F16M 2200/041; F16M 11/105
See application file for complete search history.

(56) References Cited

U.S. PATENT DOCUMENTS

| | | | |
|---|---|---|---|
| 2007/0064379 A1 | 3/2007 | Shin | |
| 2008/0055829 A1* | 3/2008 | Ko | H04M 1/0247 361/679.06 |
| 2010/0250152 A1 | 9/2010 | Farrow | |
| 2011/0105202 A1* | 5/2011 | Kim | H04M 1/0233 455/575.1 |
| 2011/0111812 A1* | 5/2011 | Kim | H04M 1/0227 455/575.1 |
| 2011/0292576 A1* | 12/2011 | Liang | H04M 1/0227 361/679.01 |
| 2013/0044414 A1* | 2/2013 | Peng | H04M 1/0227 361/679.01 |
| 2015/0292670 A1 | 10/2015 | Sweere et al. | |
| 2018/0288370 A1 | 10/2018 | Rodriguez et al. | |

FOREIGN PATENT DOCUMENTS

| | | |
|---|---|---|
| CN | 102954100 A | 3/2013 |
| CN | 108319330 A | 7/2018 |
| CN | 109074129 A | 12/2018 |
| CN | 109424835 A | 3/2019 |
| EP | 1536398 A1 | 6/2005 |
| EP | 3450815 A1 | 3/2019 |
| JP | 2012039241 A | 2/2012 |
| JP | 2017161714 A | 9/2017 |
| WO | 2015060629 A1 | 4/2015 |

OTHER PUBLICATIONS https://www.dictionary.com/browse/translate.*
"Future Automation QA2-PTL Portrait to Landscape Electric TV Bracket at Cedia 2016", Retrieved From: https://www.youtube.com/watch?v=2cn4Jj0HL-U, Dec. 13, 2016, 3 Pages.
"Mount-It! Universal Single Monitor Desk Mount—MI-2751", Retrieved From: https://mount-it.com/collections/monitor-mounts/products/mount-it-universal-single-monitor-desk-mount-mi-2751, Retrieved On: Apr. 7, 2022, 3 Pages.
"Search Report & Written Opinion issued in Netherlands Application No. N2023844", dated Jul. 1, 2020, 9 Pages.
"International Search Report and Written Opinion Issued in PCT Application No. PCT/US2020/049481", dated Dec. 9, 2020, 12 Pages.
"First Office Action and Search Report Issued in Chinese Patent Application No. 202080065882.3", dated Aug. 22, 2023, 12 Pages.

* cited by examiner

DISPLAY COUNTERBALANCE MECHANISM

CROSS REFERENCE TO RELATED APPLICATIONS

The present application is a U.S. National Phase of International Patent Application Serial No. PCT/US2020/049841 entitled "DISPLAY COUNTERBALANCE MECHANISM", filed Sep. 9, 2020, which claims priority to Netherlands Patent Application Serial No. 2023844, filed Sep. 18, 2019, the entire contents of each of which are hereby incorporated by reference for all purposes.

BACKGROUND

Some display devices, such as a virtual whiteboard, are configured to rotate. A rotating display device may be mounted on a wall, a desk or a floor-based stand via a mounting assembly that enables users to rotate the display device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to display assemblies and counterbalance mechanisms for rotatable displays. In one example, a counterbalance mechanism for a rotatable display comprises at least one crank arm rotatably connected to a ground. The counterbalance mechanism also comprises at least one spring comprising a first end connected to a spring end of the at least one crank arm, and a second end connected to the ground. At least one connecting link has a first portion connected to the at least one crank arm and a second portion connected to the rotatable display.

Another example provides a counterbalance mechanism for a rotatable display, the counterbalance mechanism comprising at least one crank arm rotatably connected to the rotatable display. The counterbalance mechanism also comprises at least one spring comprising a first end connected to a spring end of the at least one crank arm, and a second end connected to the rotatable display. At least one connecting link has a first portion connected to the at least one crank arm and a second portion connected to a ground.

Another example provides a display assembly. The display assembly comprises a mounting assembly, a display rotatably coupled to the mounting assembly, and a counterbalance mechanism. The counterbalance mechanism comprises at least one crank arm rotatably connected to the mounting assembly. The counterbalance mechanism further comprises at least one spring comprising a first end connected to a spring end of the at least one crank arm, and a second end connected to the mounting assembly. The at least one connecting link has a first portion connected to the at least one crank arm and a second portion connected to the display.

DETAILED DESCRIPTION

Figure 1A:
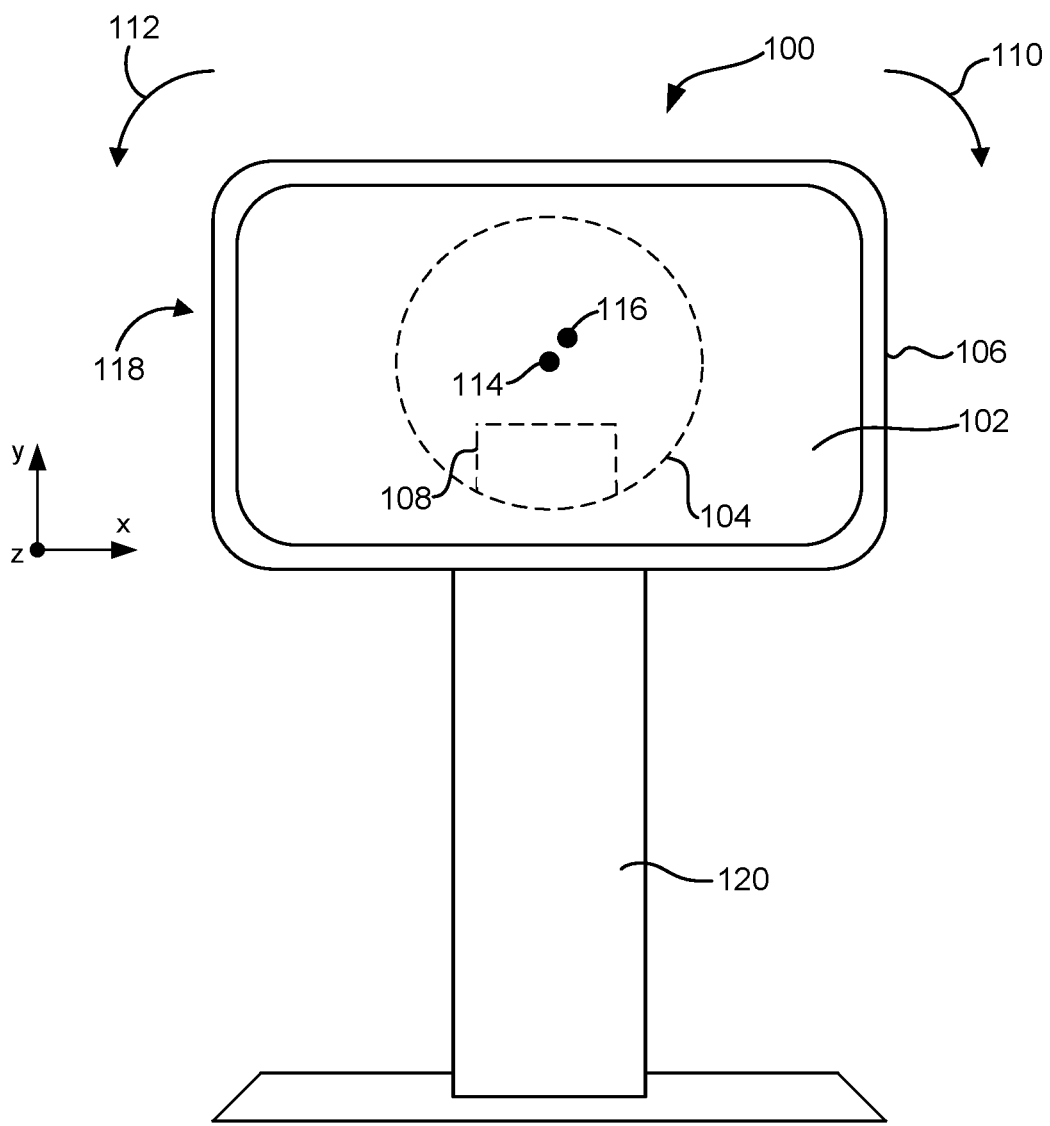
FIGS. 1A, 1B, and 1C show one example of a display assembly according to examples of the present disclosure.

Some display devices are configured to rotate. Some examples of rotatable display devices include all-in-one computing devices, electronic whiteboards and other interactive collaboration devices. Such display devices may be mounted on a wall, a floor-based stand, a rolling cart, or any other suitable surface or object via a mounting assembly that enables users to rotate the display. In this manner, the users may view and interact with content on the rotating display device at any one of a plurality of display orientations, such as a portrait orientation and a landscape orientation.

In some examples, the display is configured to rotate about a center of rotation that is offset from a center of mass of the display. As the center of mass and the center of rotation of the display are offset, the weight of the display may bias the display towards one rotational orientation, such as a portrait or landscape orientation. As a result, in some examples, the display will tend to rotate towards that orientation.

Accordingly, it may be desirable to offset such biasing forces and stabilize the rotation of the display. In some examples, the rotation of the display is stabilized by applying a counterbalance force that substantially offsets the weight of the display. In this manner, the display may be rotated between the portrait orientation and the landscape orientation by applying a substantially similar amount of torque, irrespective of a current rotational orientation of the display and a direction in which the display is rotated.

In some examples, the rotation of the display device is counterbalanced using springs. However, springs capable of offsetting the weight of the device may occupy an unsuitably large volume within a housing of the device, reducing space available for wiring and other device components. Further, the housing of the device may prevent the springs from being arranged in a suitable manner to provide a desirable torque profile.

In other examples, the rotation of the display device is counterbalanced using a weighted mass, or a combination of springs and a counterweight. However, in addition to making the device heavier, this approach may also demand additional manufacturing time or expense.

Accordingly, examples are disclosed that relate to display assemblies and counterbalance mechanisms for rotatable displays that address one or more of the above issues. As described in more detail below, in some examples a counterbalance mechanism for a rotatable display includes one or more crank arms rotatably connected to a ground or to the rotatable display. The counterbalance mechanism also comprises one or more springs comprising a first end connected to a spring end of a one crank arm, and a second end connected to the ground or to the rotatable display. At least one connecting link has a first portion connected to the crank arm and a second portion connected to the rotatable display or to the ground.

Such counterbalance mechanisms may stabilize the rotation of the display, reduce or eliminate the use of counterweights within the display, and/or occupy less space. In addition, the counterbalance mechanism may be tuned to provide a desirable torque profile, and may enable other counterbalance mechanisms to be significantly reduced/simplified or eliminated.

Figure 1B:
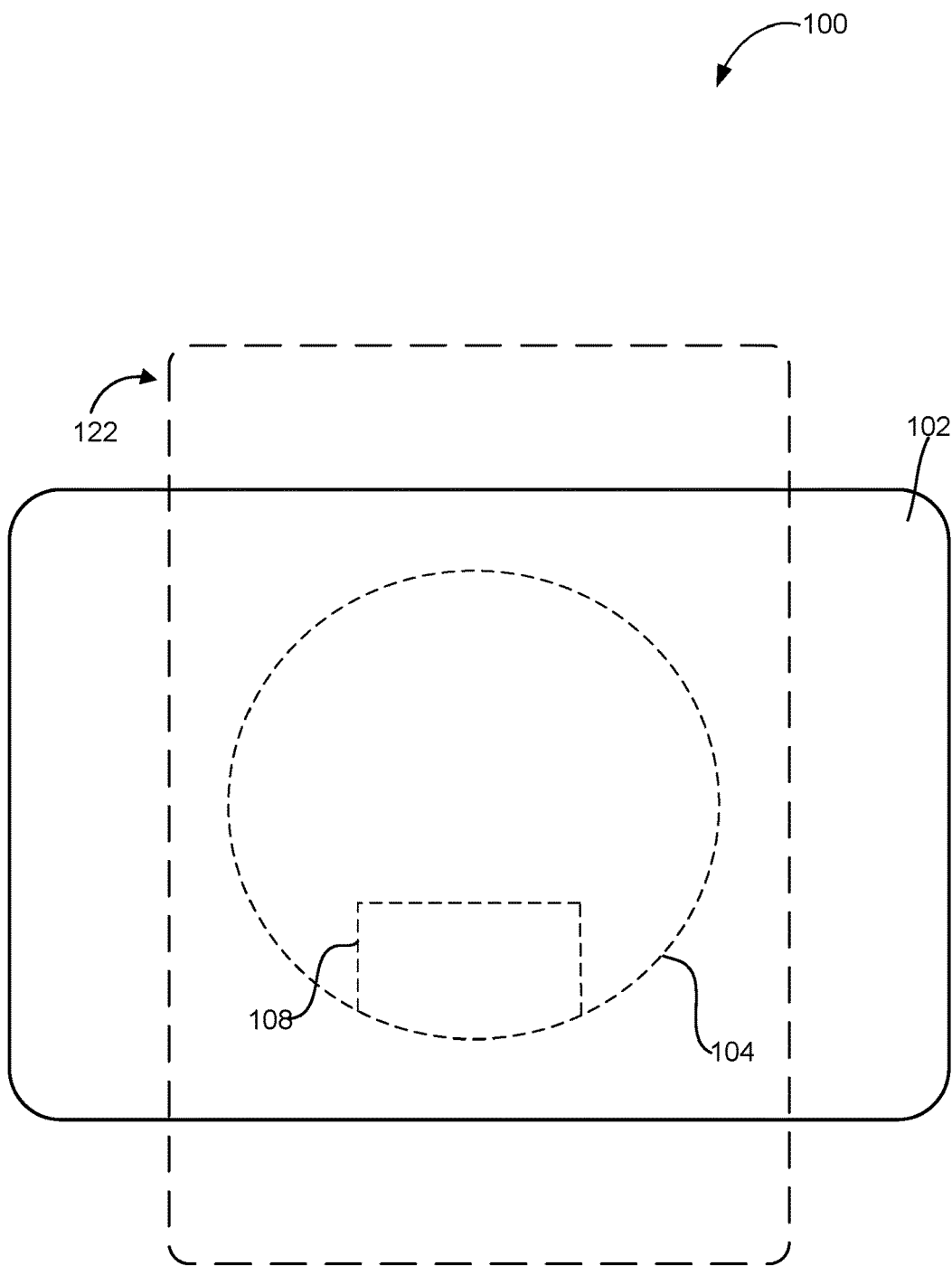

With reference now to FIGS. 1A and 1B, one example of a display assembly 100 is provided in the form of an electronic whiteboard. The example of the display assembly 100 is provided for purposes of illustration and is not intended to be limiting. Other examples to which the present disclosure may apply, such as televisions, computer monitors, and all-in-one computing devices, may have different shapes, different sizes, and different numbers and/or placements of features as compared to the display assembly 100 shown in FIGS. 1A and 1B.

The display assembly 100 includes a display 102. In some examples the display 102 is a touch-sensing display that allows users to directly interact with the display 102 and/or visual information presented on the display 102. The display 102 may be a light emitting diode (LED) display, an organic light emitting diode (OLED) display, a liquid crystal display (LCD) monitor, or any other suitable type of display.

The display 102 is communicatively coupled with a computing device 108 that provides visual information to the display 102, which the display 102, in turn, presents to a user. In the example of FIGS. 1A and 1B, the display assembly 100 includes a computing device 108 within a shared housing 106 of the display 102. In other examples, the display 102 may be communicatively coupled to one or more separate computing devices.

As described in more detail below, the display 102 is rotatably coupled to a mounting assembly 104 such that the display 102 is rotatable relative to the mounting assembly 104. In some examples and as shown in FIG. 1A, the mounting assembly 104 is configured to support the display 102 above a floor or other horizontal surface, such as via a stand 120. In other examples, the display assembly 100 may be positioned on a rolling cart to allow the display assembly 100 to be easily moved. In yet other examples, the mounting assembly 104 may comprise a plate, bracket or other structure that is connectable to a surface (e.g. a wall), mountable inside a cabinet, or supported by any other suitable structure.

Figure 1C:
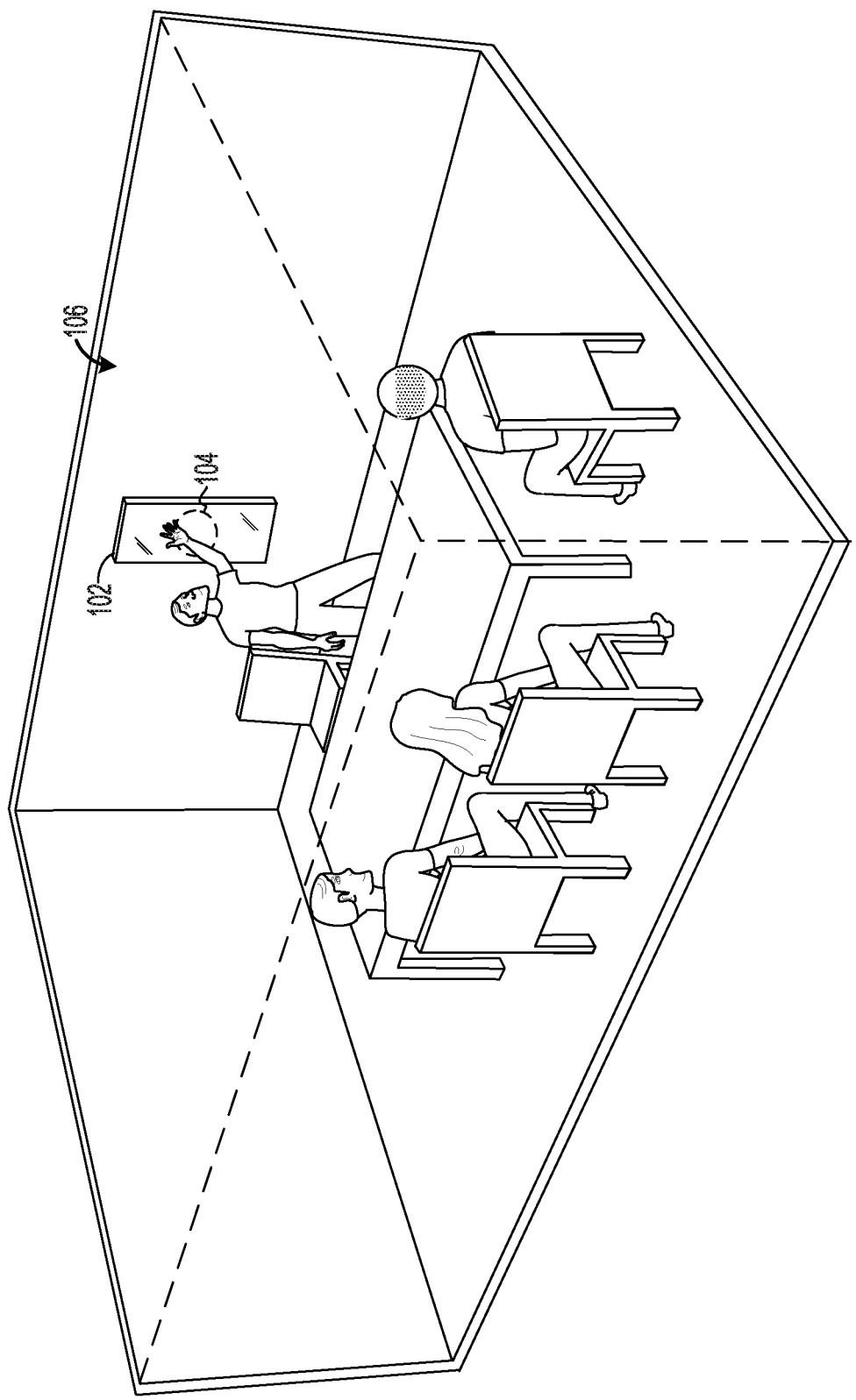

For example and with reference to FIG. 1C, the display 102 may be mounted to a wall 106 in a room 108 via the mounting assembly 104.

As described in more detail below, the mounting assembly 104 is configured to enable the display to rotate. For example, FIG. 1A shows the display 102 in a landscape orientation 118. The display 102 may be rotated relative to the fixed mounting assembly 104 by applying a force or torque to a portion of the display 102. For example, by applying torque in a clockwise direction as indicated at 110, and with reference to FIG. 1B, the display 102 may be rotated into a portrait orientation 122 or any other suitable orientation. The display 102 may be rotated back into the landscape orientation 118 by applying torque in a counterclockwise direction as indicated at 112. In other examples, display 102 may rotate from the landscape orientation 118 to a portrait orientation in the counterclockwise direction 112.

Figure 2:
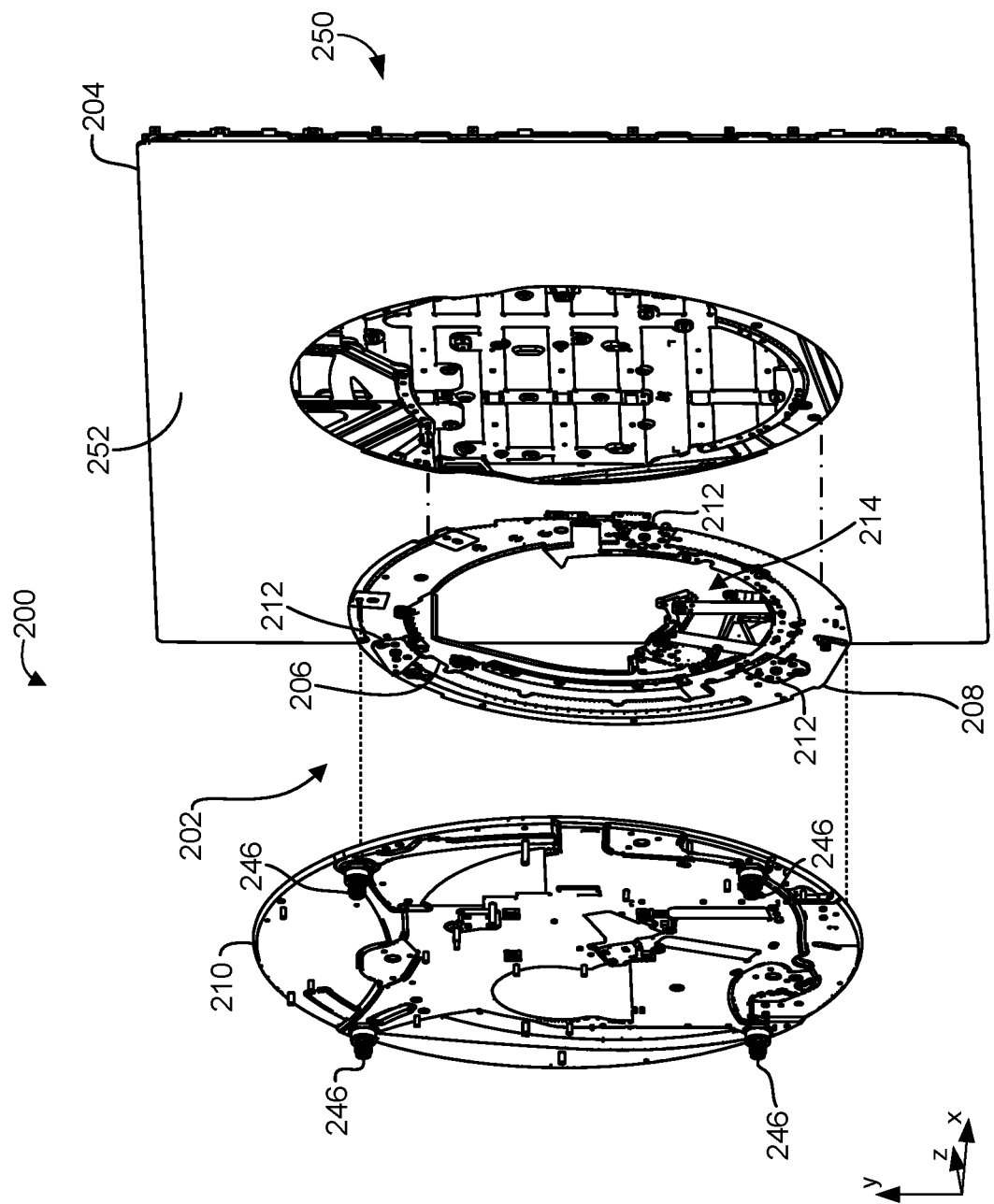
FIG. 2 illustrates a partial exploded view of one example of a display assembly according to examples of the present disclosure.
Figure 3:
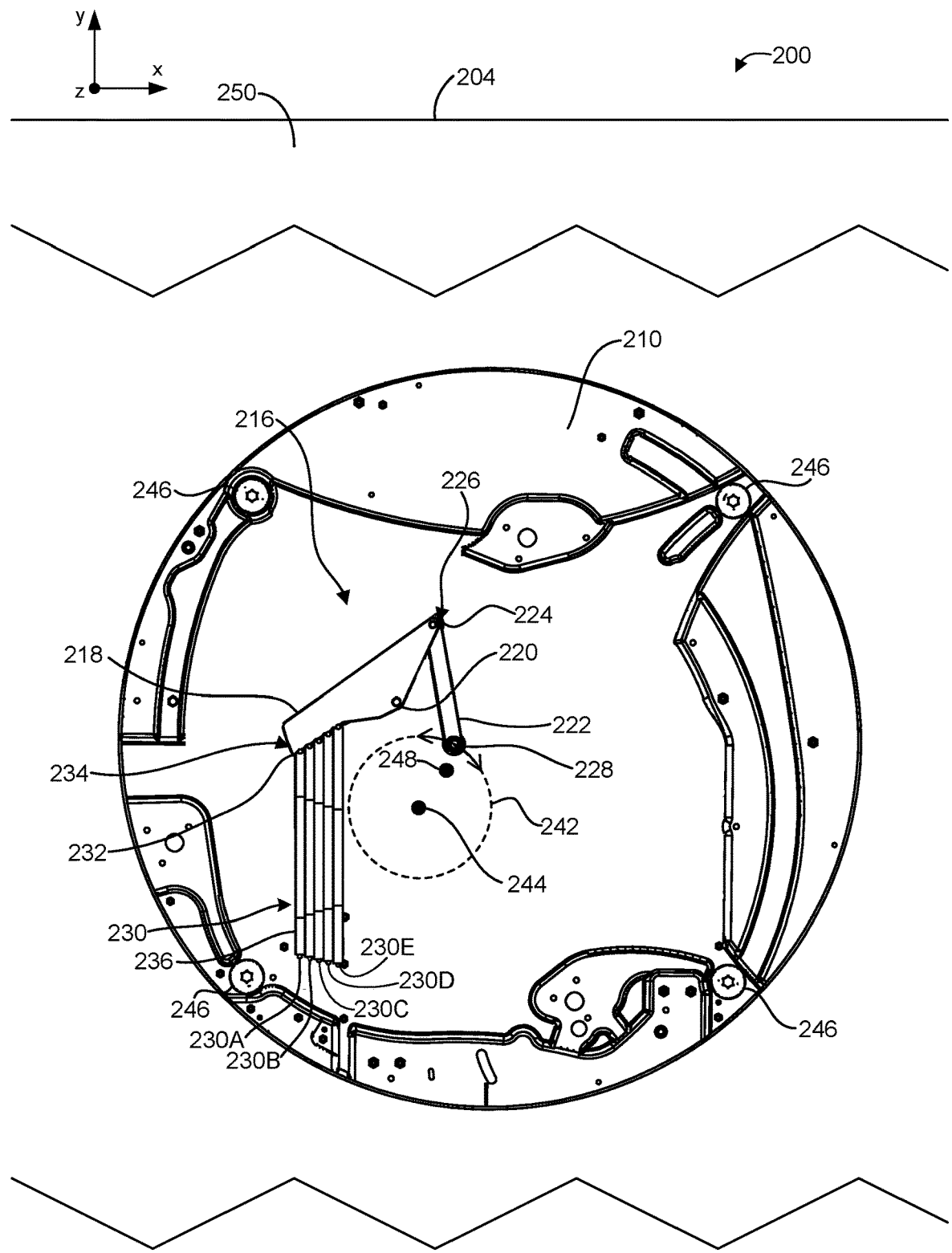
FIG. 3 shows a simplified cutaway view of the display assembly of FIG. 2 in a landscape orientation including a counterbalance mechanism according to examples of the present disclosure.

With reference now to FIGS. 2 and 3, one example of a rotatable display assembly 200 is illustrated. FIG. 2 shows an exploded view of the display assembly 200 including a rotation mechanism 202. In the example of FIG. 2, the rotation mechanism 202 is parallel to an X-Y plane in which the display 204 rotates. In this example, the rotation mechanism 202 includes a rail plate 206 that is coupled to the display 204 at a rear side 252 of the display. The rail plate 206 is rotatably coupled to a roller plate 208, and the roller plate 208 is fixedly coupled to a mounting assembly 210. The mounting assembly 210 is fixedly coupled to an anchor structure, such as a wall, mounting stand, rolling cart, or other anchor. In this example, the mounting assembly 210 includes four bolts 246 that secure the mounting assembly 210 to the anchor structure.

The rail plate 206 and the roller plate 208 may be coupled together via any suitable means that enables the rail plate 206 (and attached display 204) to rotate relative to the roller plate 208. For example, the rail plate 206 and the roller plate 208 may be coupled via bearings, wheels, an interlocking rail and track, or a system of gears. In the example illustrated in FIG. 2, three rollers 212 are mounted to the roller plate 208 around the circumference of the roller plate 208. Each of the rollers 212 is configured to interface with at least one rail on the rail plate 206 to enable the rail plate 206 to rotate relative to the roller plate 208. In this manner, the display 204 and any other components of the display assembly 200 that are attached to the rail plate 206 may rotate relative to the roller plate 208 and the mounting assembly 210.

In some examples, and with reference again to FIG. 1A, the display 102 is configured to rotate about a center of rotation 114 that is offset from a center of mass 116 of the display 102. In one example, the center of mass 116 may be offset from the center of rotation 114 by approximately 50 mm along the positive x-axis and approximately 50 mm along the positive y-axis. In other examples, the center of mass 116 may be offset from the center of rotation 114 by other distances and in other orientations. As the center of mass 116 is offset from the center of rotation 114 within the X-Y plane, the display 102 may be gravitationally biased towards one rotational orientation, such as a portrait orientation. For example, when the display assembly 100 is configured in the landscape orientation 118 as shown in FIG. 1A, gravity will tend to rotate the display 102 in the clockwise direction 110 absent any countervailing forces. Accordingly, and as described in more detail below, the display assembly 100 may include one or more counterbalance mechanisms configured to stabilize the rotational orientation of the display.

For example, and with reference now to FIG. 3, the display assembly 200 includes a counterbalance mechanism 216 configured to provide a counterbalance force to stabilize the rotational orientation of the display 204. In FIG. 3, the display assembly 200 of FIG. 2 is depicted in a simplified cutaway view through a front side 250 of the display 204, as viewed from the positive z-axis looking towards the negative z-axis. In this example the display 204 is in a landscape orientation and rotates about a center of rotation 244 that is offset from a center of mass 248. For ease of illustration, other components of the display assembly 200 are not shown.

As illustrated by example in FIG. 3, the counterbalance mechanism 216 includes a crank arm 218. The crank arm 218 is located at a z-axis position between the display 204 and the underlying mounting assembly 210. In this example and as described below, the crank arm 218 rotates in an X-Y plane parallel to the X-Y plane in which the display 204 rotates.

The crank arm 218 is rotatably connected to a ground. In the example of FIG. 3, the crank arm 218 is rotatably connected to an underlying plate of the mounting assembly 210 via a pivot in the form of a pin 220 extending from the underlying plate. In some examples, as illustrated in FIG. 3, the crank arm 218 comprises a generally triangularly shaped lever, and the pin 220 is located at an obtusely-angled vertex of the lever. In other examples, a variety of other shapes of crank arms may be utilized. In this example, the pin 220 is also located between a link end 226 and a spring end 234 of the crank arm 218. In other examples described below, the crank arm 218 may be rotatably connected to the ground at a point substantially at one end of the crank arm.

The counterbalance mechanism 216 further comprises a connecting link 222. The connecting link 222 has a first portion 224 that is rotatably connected to the crank arm 218 at its link end 226. In other examples, the first portion 224 of the connecting link 222 may be connected to a point between the spring end 234 and the link end 226 of the crank arm 218. The connecting link 222 also has a second portion 228 that is rotatably connected to the display 204. In this manner and as described in more detail below, the connecting link 222 is configured to couple rotation of the display 204 to rotation of the crank arm 218 about the pin 220.

The counterbalance mechanism 216 also includes at least one spring that biases the other spring end 234 of the crank arm 218. In different examples, the counterbalance mechanism 216 may utilize a single spring or multiple springs or spring elements. The spring(s) may comprise any suitable type of spring, such as a helical extension spring or a volute spring, and may comprise any suitable material, such as spring steel or an elastomer. In the example of FIG. 3, the counterbalance mechanism 216 utilizes spring 230 that comprises multiple individual extension springs 230A, 230B, 230C, 230D and 230E.

In the example of FIG. 3, the spring 230A comprises a first end 232 connected to the spring end 234 of the crank arm 218. A second end 236 of the spring 230A is connected to the ground (e.g. to the mounting assembly 210). As shown in FIG. 3 the other springs 230B, 230C, 230D, and 230E are connected in a similar manner.

With this configuration and as described in more detail below, rotation of the display 204 causes the second portion 228 of connecting link 222 to move in a corresponding circular path indicated by dotted circle 242. Such motion of the connecting link 222 causes rotation of the crank arm 218 about the pin 220, which causes extension or retraction of the springs 230.

In the example of FIG. 3, the each of the individual springs 230A, 230B, 230C, 230D, and 230E are extension springs. Accordingly, when the display 204 is in the landscape orientation as shown in FIG. 3, the springs 230 oppose the gravitational tendency of the display to rotate in a clockwise direction about its center of rotation 244. As illustrated in FIG. 3, the springs 230 provide such an oppositional force by pulling downwardly on the spring end 234 of the crank arm 218 to resist the opposing downward force on the link end 226 of the crank arm that is received via connecting link 222 connected to the display. Additionally, when a user begins rotating the display 204 in the clockwise direction toward the portrait orientation shown in FIG. 4, the springs 230 extend and generate a countervailing return force on the spring end 234 of the crank arm 218 that is transferred via the connecting link to the display. In this manner, the counterbalance mechanism 216 is configured to resist gravitational forces urging the display 204 to fall into the portrait orientation. Accordingly, the counterbalance mechanism 216 may help provide a consistent oppositional force and create a more pleasing user experience during such rotation.

Figure 4:
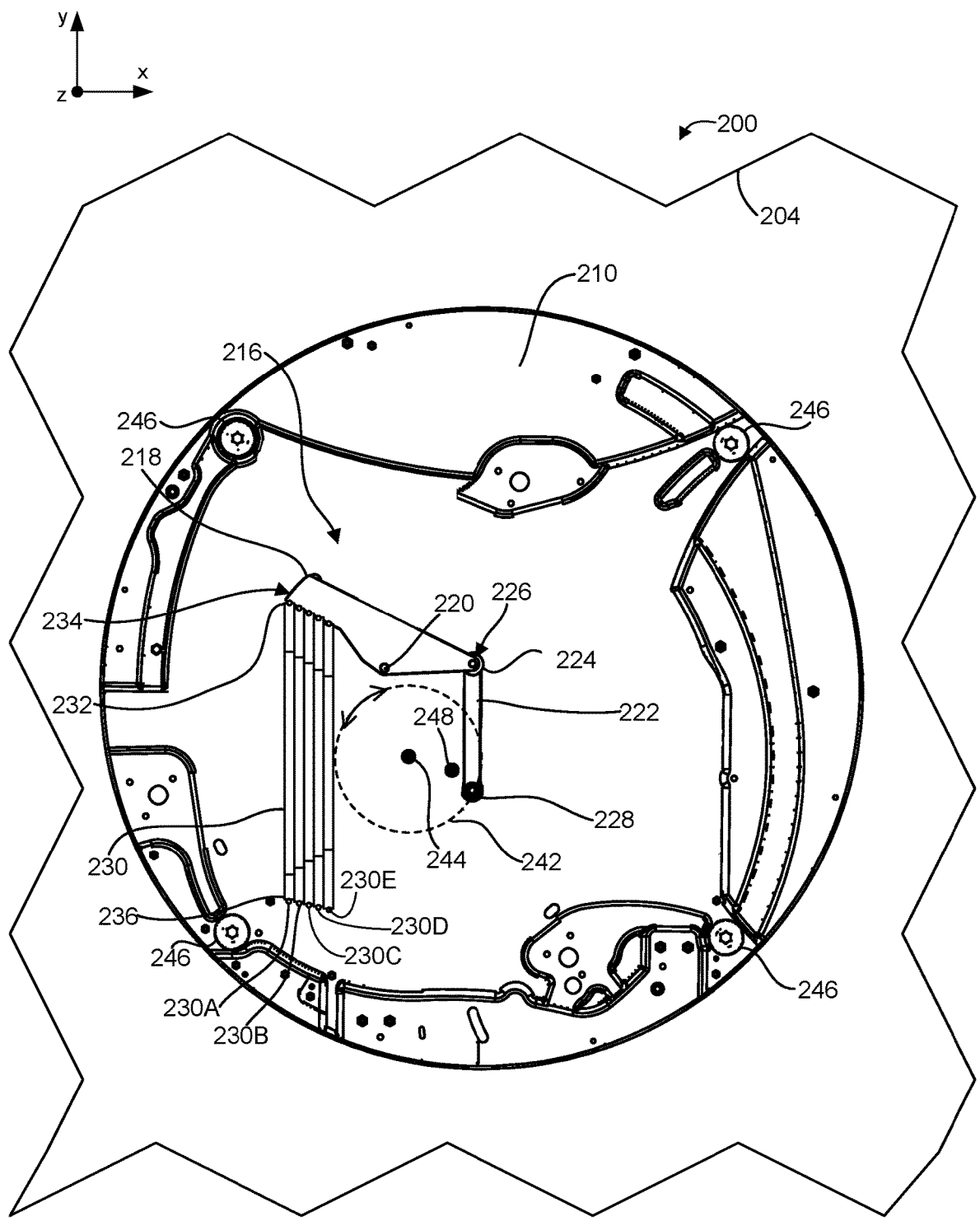
FIG. 4 shows the display assembly and counterbalance mechanism of FIG. 3 in a portrait orientation according to examples of the present disclosure.

FIG. 4 shows the display assembly of FIG. 3 rotated clockwise 90 degrees into a portrait orientation. In a similar manner, the second portion 228 of the connecting link 222 has moved in a curving direction along circular path 242. Accordingly, the connecting link 222 is located at a lower position along the y-axis in FIG. 4 than in FIG. 3.

As the first portion 224 of the connecting link 222 is connected to the link end 226 of the crank arm 218, rotation of the display 204 causes rotation of the crank arm 218 about the pin 220. Accordingly, the link end 226 of the crank arm 218 is located at a lower position along the y-axis in FIG. 4 than in FIG. 3, and the spring end 234 of the crank arm 218 is located at a higher position along the y-axis in FIG. 4 than in FIG. 3. This movement correspondingly causes the springs 230 to extend along the y-axis and exert downward y-axis force on the spring end 234 of the crank arm 218.

The counterbalance mechanism 216 may also provide other advantages over other systems. For example, the counterbalance mechanism 216 may weigh less than a counterweight used to counteract the gravitational forces described above. The counterbalance mechanism 216 may also occupy less space within a housing of the display assembly 200 than other configurations, such as springs that rotate with the display 204. In some examples, the counterbalance mechanism 216 is preconfigured as a single modular assembly, which may be more easily installed into the display assembly during manufacturing as compared to assembling a number of smaller components with greater precision. Furthermore, the counterbalance mechanism 216 may be configured to occupy a smaller footprint and to position the spring(s) 230 where they may have a suitable amount of room to extend within the display assembly 200.

The counterbalance mechanism 216 also enables the torque profile of the display assembly 200 to be tuned to provide a desirable amount of resistance for a pleasing user experience. For example, the torque profile may be customized to provide a substantially consistent amount of resistance during rotation, or the torque profile may be adjusted to provide resistance that varies based on the angle of rotation. In different examples, the torque profile may be tuned by utilizing springs having different parameters (diameter, pitch, etc.), utilizing different sizes and/or shapes of crank arms and connecting links, and/or changing other components or locations of components within the counterbalance mechanism 216.

Figure 5:
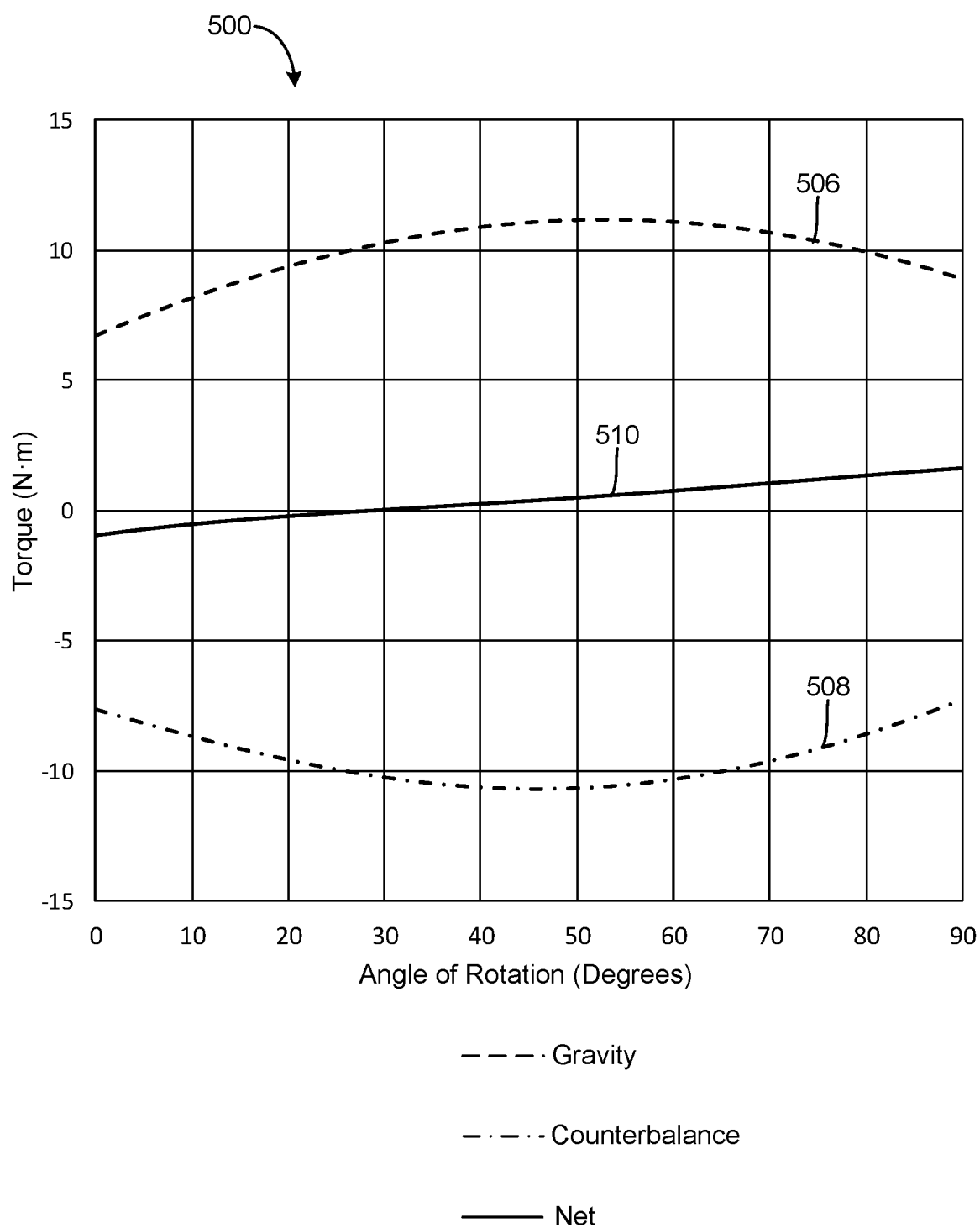
FIG. 5 illustrates a plot providing one example of a torque profile for a counterbalance mechanism according to examples of the present disclosure.

With reference now to FIG. 5, a plot 500 is illustrated that shows one example of a torque profile for a display assembly and counterbalance mechanism of the present disclosure, such as counterbalance mechanism 216. The plot 500 shows the torque on the center of rotation of the display assembly as a function of the angle of rotation of the display. In the example of FIG. 5, the angle of rotation of the display is 0 degrees when the display is in a landscape orientation, and the angle of rotation is 90 degrees when the display is in a portrait orientation.

FIG. 5 shows a first line 506 that represents a contribution to the torque 502 due to gravity. In the example of FIG. 5, the first line 506 is positive everywhere from 0 to 90 degrees, showing that the weight of the display alone torques the display towards the portrait orientation. The dashed line 506 has a curved shape, indicating that the weight of the display generally provides greater torque on the display between its travel from 0 to 90 degrees than at either zero degrees or 90 degrees. This is due to the position of the center of mass relative to the center of rotation.

FIG. 5 also illustrates a second line 508 that represents a countervailing contribution to the torque from the counterbalance mechanism. The negative torque of the second line 508 shows that the counterbalance mechanism urges the display towards the landscape orientation. Solid line 510 shows the net torque resulting from adding the first line 506 and the second line 508. As described further below, from 0 to 90 degrees the net torque varies from slightly negative to slightly positive.

In some examples, the counterbalance mechanism is tuned to provide a desirable net torque profile. For example, and with reference again to FIGS. 3 and 4, the force of the spring 230, the angle between the crank arm 218 and the spring 230, and any other suitable parameters may be tuned such that the counterbalance mechanism 216 provides a desirable amount of torque during rotation of the display. In other examples, each of the individual springs 230A, 230B, 230C, 230D, and 230E may be staggered such that the springs change length at different rates as the display 204 is rotated.

With reference again to FIG. 5, the solid line 510 illustrates one example of a desirable net torque profile. As illustrated in FIG. 5, the line 510 is slightly negative at zero degrees. In this manner, the net torque acts to urge the display to stay in the landscape orientation. As the display is rotated, the net torque may increase, such that the display more easily falls into the portrait orientation. In the example of FIG. 5, when the display is rotated by 30 degrees or more, the net torque on the display becomes positive. In this manner, the torque profile may assist a user in rotating the display into portrait mode.

In some examples, the display assembly may also include one or more additional structures configured to tailor the torque profile. For example, and with reference again to FIG. 2, the display assembly 200 includes a damper system 214. In one example, the damper system 214 may have a non-circular gear that engages with a track to turn a dampening motor at different rotational rates as the display 204 rotates. The damper system 214 is configured to provide a dampening torque as a function of a rate of rotation of the display 204. In this manner, the damper system 214 may limit and/or prevent rotation at excessive speeds.

In the example of the counterbalance mechanism 216 shown in FIGS. 3 and 4 and described above, the counterbalance mechanism 216 uses one crank arm 218 and one connecting link 222 and corresponding springs. In other examples and as described below, counterbalance mechanisms of the present disclosure may include a two or more crank arms and connecting links, along with corresponding springs configured to provide oppositional forces and create a pleasing user experience during rotation of the display.

Figure 6:
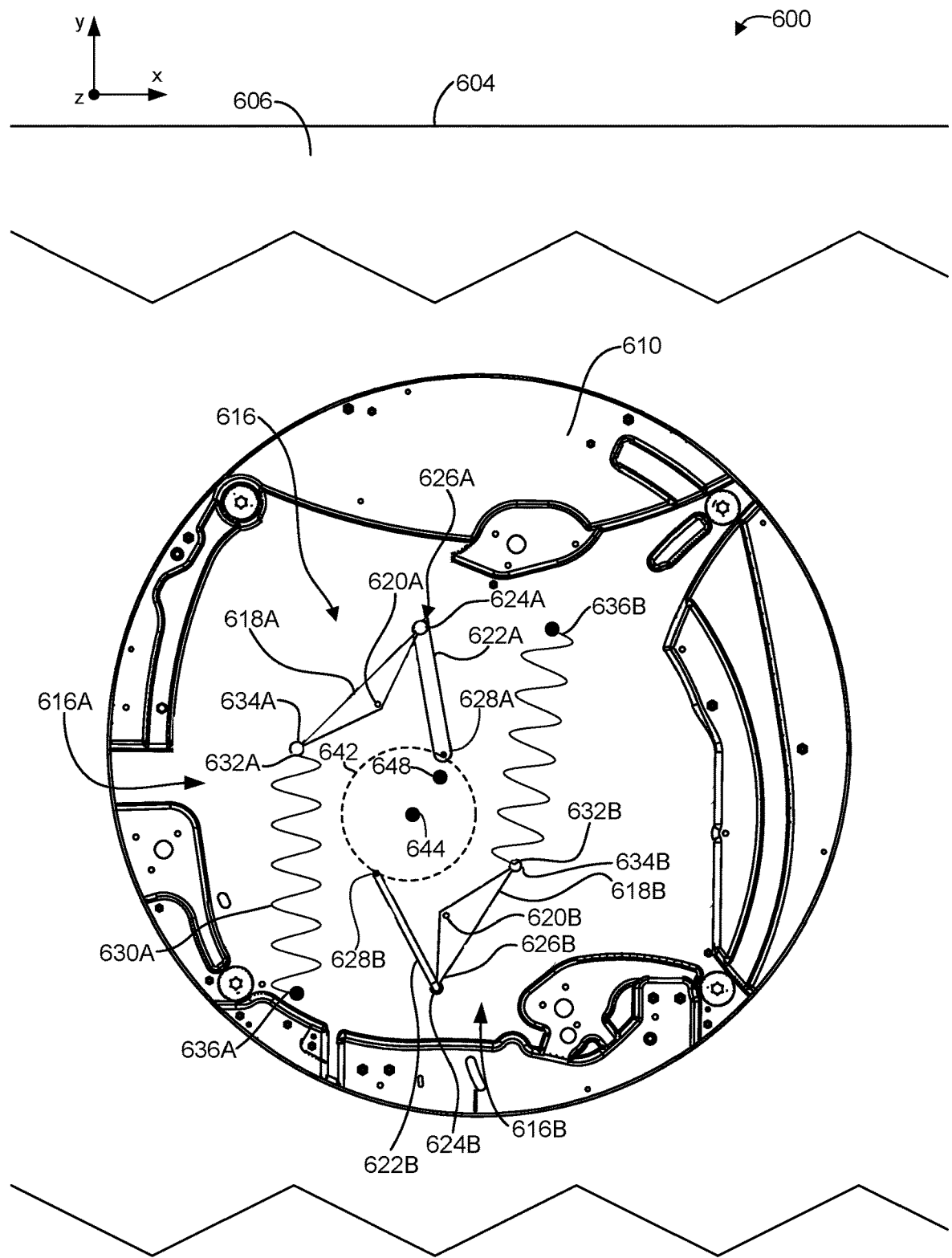
FIG. 6 shows a simplified cutaway view of another example of a display assembly and counterbalance mechanism in a landscape orientation according to examples of the present disclosure.
Figure 7:
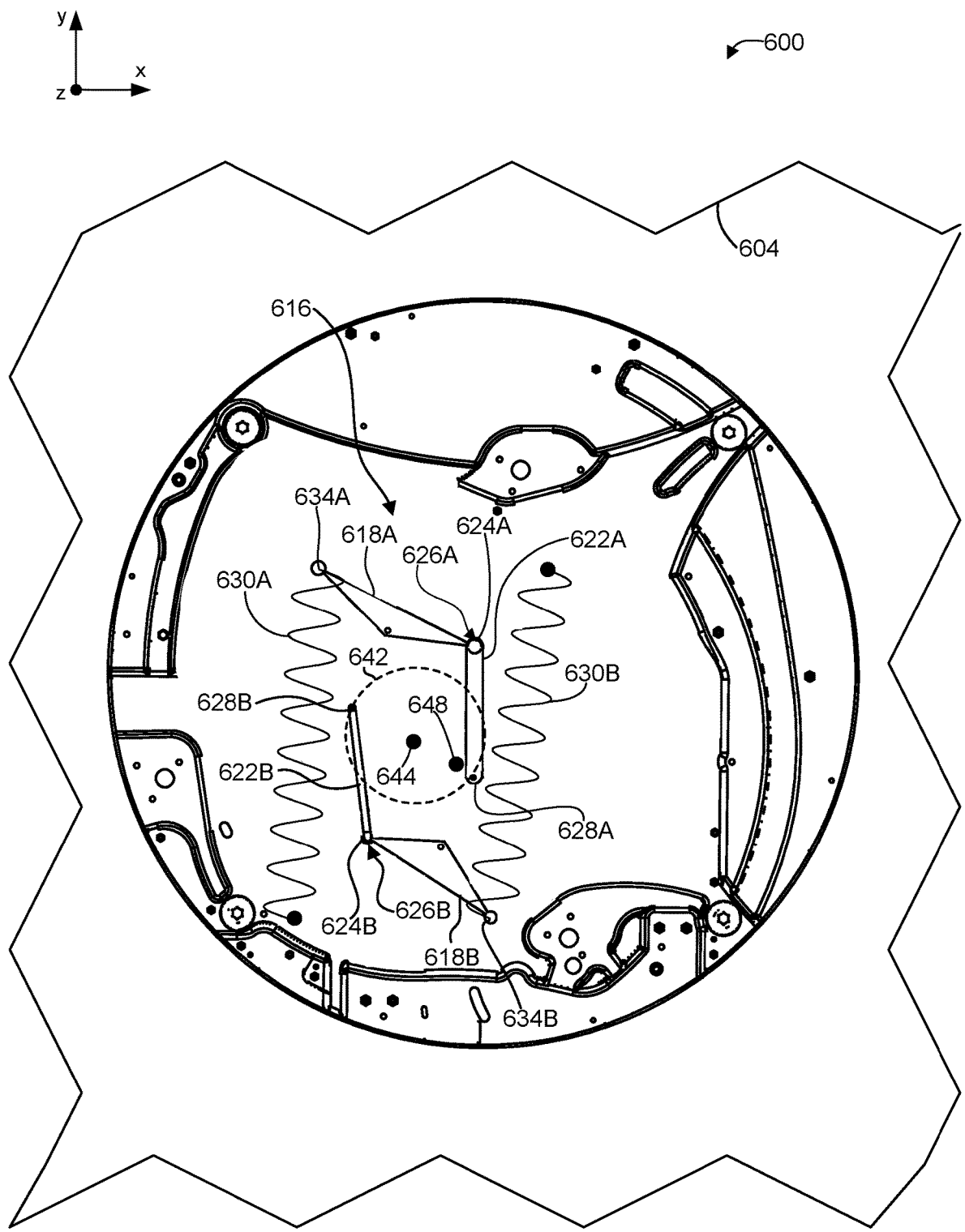
FIG. 7 shows a cutaway view of the display assembly and counterbalance mechanism of FIG. 6 in a portrait orientation according to examples of the present disclosure.

For example, and with reference now to FIGS. 6 and 7, another example of a display assembly 600 is illustrated that includes a counterbalance mechanism 616 configured to counterbalance rotation of a display 604. In the example of FIGS. 6 and 7, the counterbalance mechanism 616 includes two crank arms, two springs, and two connecting links.

In FIG. 6, the display assembly 600 is depicted in a cutaway view through a front side 606 of the display 604. The display assembly 600 is viewed from the positive z-axis looking towards the negative z-axis. In this example the display 604 is in a landscape orientation and rotates about a center of rotation 644 that is offset from a center of mass 648.

In the example of FIG. 6, the counterbalance mechanism 616 includes a first counterbalance mechanism 616A and a second counterbalance mechanism 616B. The first counterbalance mechanism 616A and the second counterbalance mechanism 616B are located on opposite sides of the center of rotation 644 of the display 604.

As illustrated by example in FIG. 6, the counterbalance mechanism 616 includes a first crank arm 618A and a second crank arm 618B. Each of the first crank arm 618A and the second crank arm 618B is located at a z-axis position between the display 604 and mounting assembly 610. The mounting assembly 610 may be analogous to the mounting assembly 210 of FIGS. 2-4. In the example of FIG. 6, each of the first crank arm 618A and the second crank arm 618B rotates in a plane parallel to the X-Y plane in which the display 604 rotates.

Like the crank arm 218 in the example of FIGS. 3 and 4, each of the first crank arm 618A and the second crank arm 618B is rotatably coupled to a ground. In the example of FIG. 6, the crank arm 618A is rotatably coupled to an underlying plate of the mounting assembly 610 via a pivot in the form of a pin 620A extending from the underlying plate. Similarly, the crank arm 616B is rotatably coupled to the underlying plate via a pin 620B extending from the underlying plate. As illustrated by example in FIG. 6, the first crank arm 618A and the second crank arm 618B are generally triangularly shaped, however the first crank arm 618A is generally more obtuse and narrower than the second crank arm 618B. In other examples, the first crank arm 618A and the second crank arm 618B may have identical shapes or any other suitable combination of shapes.

The counterbalance mechanism 616 further comprises a first connecting link 622A and a second connecting link 622B. The first connecting link 622A has a first portion 624A that is rotatably connected to a link end 626A of the first crank arm 818A. In a similar manner, the second connecting link 622B has a first portion 624B that is rotatably connected to a link end 626B the second crank arm 618B. Each of the first connecting link 622A and the second connecting link 622B also has a second portion 628A and 628B, respectively, that is connected to the display 604.

In the example of FIG. 6, the second connecting link 622B is narrower than the first connecting link 622A. In other examples, the first connecting link 622A and the second connecting link 622B may have identical shapes or any other suitable combination of shapes.

In this example of FIGS. 6 and 7, the first mechanism 616A utilizes a single spring 630A and the second mechanism 616B utilizes a single spring 630B. In different examples, the first mechanism 616A and the second mechanism 616B may utilize multiple springs or spring elements.

The spring 630A comprises a first end 632A connected to a spring end 634A of the crank arm 618A. A second end 636A of spring 630A is connected to the ground (e.g. to the mounting assembly 610). In a similar manner, the spring 630B comprises a first end 632B connected to a spring end 634B of the crank arm 618B, and a second end 636B connected to the mounting assembly 610. In this manner, the counterbalance mechanism 616 is configured to couple extension of spring 630A and spring 630B to the rotation of the display 604. With this configuration and as described in more detail below, rotation of the display 604 causes the second portion 628A of the first connecting link 622A and the second portion 628B of the second connecting link 622B to move in a corresponding circular path indicated by dotted circle 642. Such motion of the connecting links 662A and 622B cause rotation of the corresponding crank arms 618A and 618B about pins 620A and 620B, which cause extension or retraction of the springs 630A and 630B, respectively.

FIG. 7 shows the display assembly of FIG. 6 rotated clockwise 90 degrees into a portrait orientation. In a similar manner, second portion 628A of the first connecting link 622A and the second portion 628B of the second connecting link 622B have moved in a circular manner along circular path 642. Accordingly, the connecting link 622A is located at a lower position along the y-axis in FIG. 7 than in FIG. 6, and connecting link 622B is located at a higher position along the y-axis in FIG. 7 than in FIG. 6. This movement correspondingly causes the springs 630A and 630B to extend along the y-axis, with spring 630A exerting a downward y-axis force on the spring end 634A of the crank arm 618A, and spring 630B exerting an upward y-axis force on the spring end 634B of the crank arm 618B. In this manner, the counterbalance mechanism 616 is configured to resist forces urging the display 604 to fall into the portrait orientation.

As with the counterbalance mechanism 216 described above, counterbalance mechanism 616 may also provide other advantages over other systems. For example, the counterbalance mechanism 216 may weigh less than systems using counterweight(s) to counteract the gravitational forces. The counterbalance mechanism 616 may also occupy less space within the display assembly 600 than other configurations. In some examples, the counterbalance mechanism 616 may be configured to occupy a smaller footprint and to position the spring(s) 630A and 630B where they may have a suitable amount of room to extend within the display assembly 600. The counterbalance mechanism 616 also enables the torque profile of the display assembly 600 to be tuned to provide a desirable amount of resistance for a pleasing user experience. For example, this configuration of two crank arms, two springs, and two connecting links may enable fine control and tuning of the torque profile, with each counterbalance mechanism 616A and 616B being individually adjustable to modify the torque profile in different manners.

Figure 8:
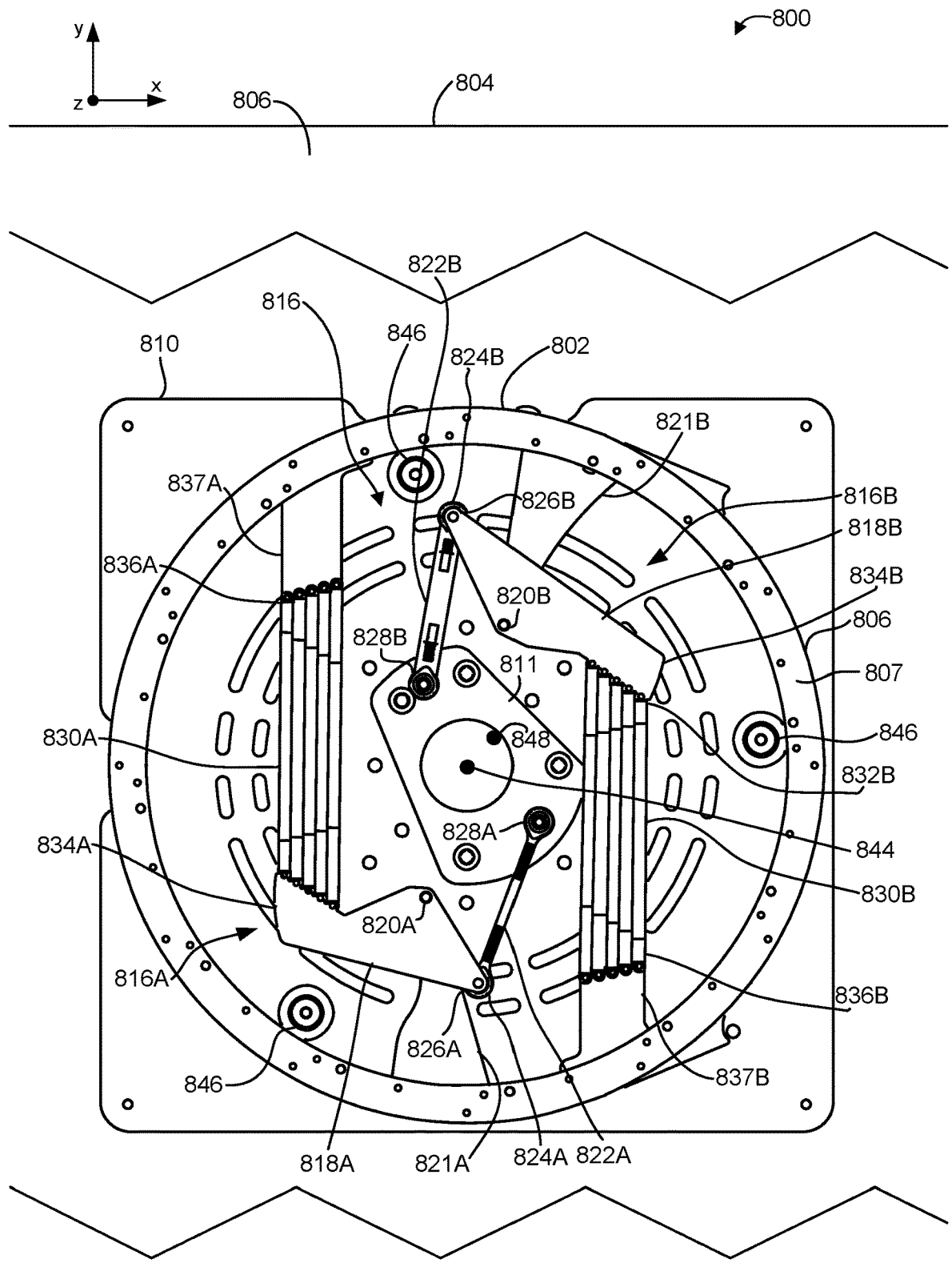
FIG. 8 shows another example of a counterbalance mechanism according to examples of the present disclosure.
Figure 9:
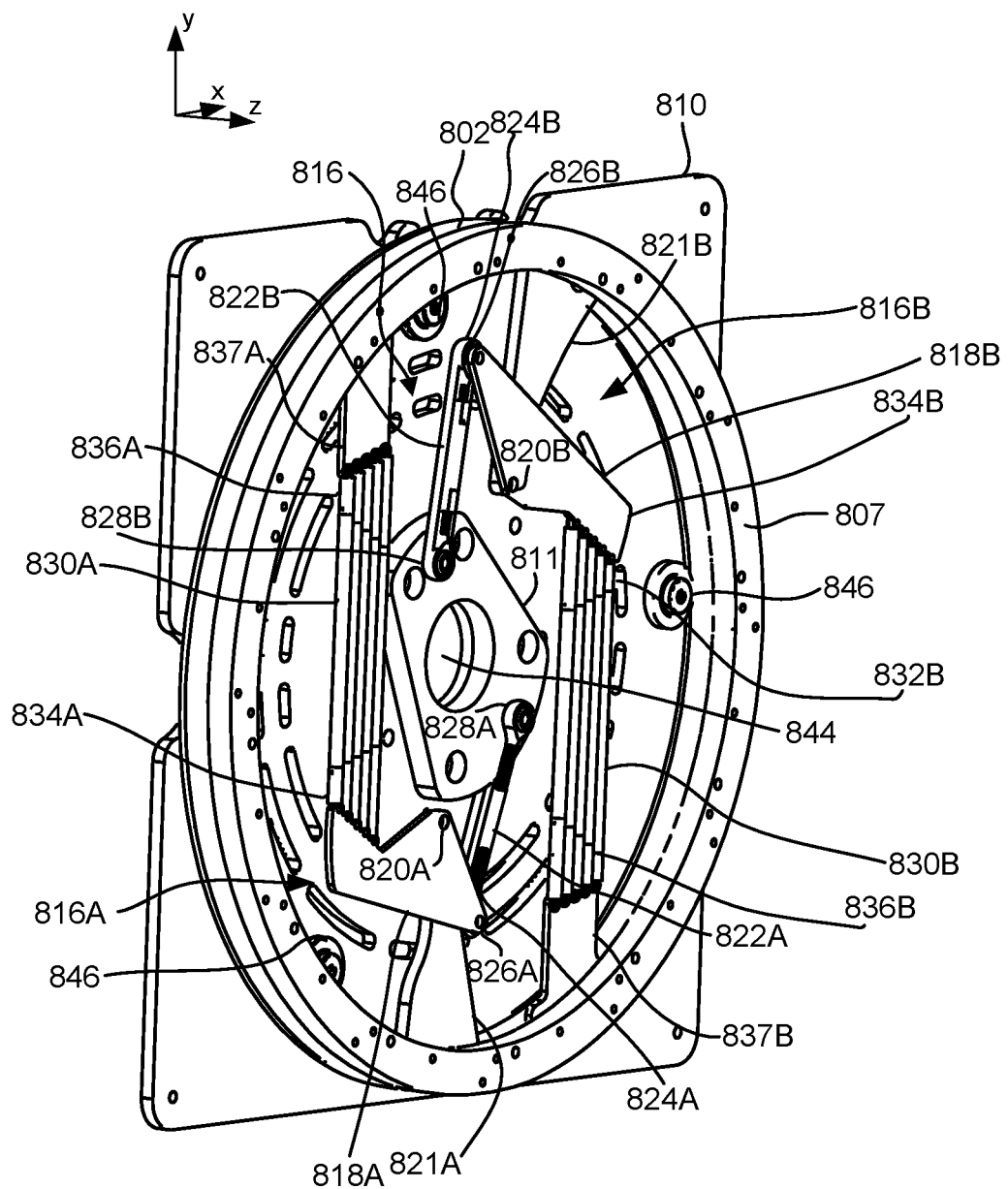
FIG. 9 illustrates another view of the counterbalance mechanism of FIG. 8 according to examples of the present disclosure.
Figure 10:
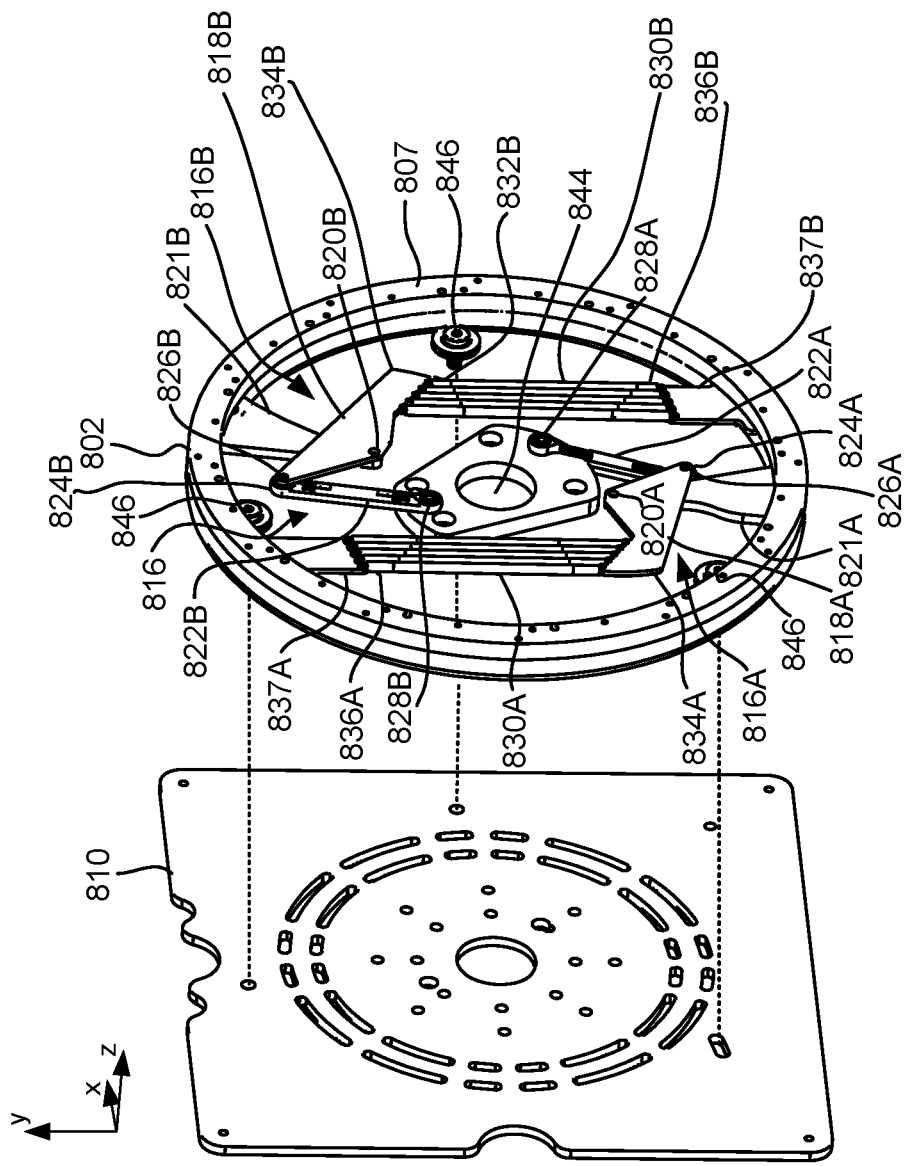
FIG. 10 shows an exploded view of the counterbalance mechanism of FIG. 8 according to examples of the present disclosure.

It will also be appreciated that the operative connections of each of the components of the counterbalance mechanisms 216 and 616 may be arranged in any other suitable manner. For example, each of the one or more crank arms may be rotatably coupled to the rotatable display instead of the ground, each of the one or more springs may also be connected to the rotatable display instead of the ground, and each of the one or more connecting links may be connected to the ground instead of to the rotatable display. FIGS. 8-10 illustrate one such example of a counterbalance mechanism 816.

FIG. 8 shows the counterbalance mechanism 816 configured to counterbalance rotation of a display 804. In the example of FIGS. 8-10, the counterbalance mechanism 816 includes two crank arms, two springs, and two connecting links. In FIG. 8, the display assembly 800 is depicted in a cutaway view through a front side 806 of the display 804. The display assembly 800 is viewed from the positive z-axis looking towards the negative z-axis. In this example the display 804 is in a landscape orientation and rotates about a center of rotation 844 that is offset from a center of mass 848.

In this example a rotation mechanism includes a circular rail 802 to which the display 804 is fixedly coupled. Three rollers 846 are rotatably mounted to an underlying chassis 810 of a mounting assembly. Circular rail 802 is configured to engage the rollers 846 along its inner periphery to allow the circular rail and attached display to rotate relative to the chassis 810 and mounting assembly. The circular rail 802 is parallel to an X-Y plane of the chassis 810, and is configured to rotate about a center of rotation 844 that is offset from a center of mass 848 of the display 804.

FIG. 9 shows an angled view of the counterbalance mechanism 816, the circular rail 802, and the chassis 810. FIG. 10 shows an exploded view of the counterbalance mechanism 816, the circular rail 802, and the chassis 810.

Like the counterbalance mechanism 616 in the example of FIGS. 6-7, the counterbalance mechanism 816 includes two crank arms, two springs, and two connecting links. The counterbalance mechanism 816 includes a first counterbalance mechanism 816A and a second counterbalance mechanism 816B. The first counterbalance mechanism 816A and the second counterbalance mechanism 816B are located on opposite sides of the center of rotation 844 of the rotation mechanism 802.

The counterbalance mechanism 816 includes a first crank arm 818A and a second crank arm 818B. Each of the first crank arm 818A and the second crank arm 818B are parallel to the X-Y plane of the chassis 810 and are located at a z-axis position between the chassis 810 and a front surface 807 of the circular rail 802. In this manner, the crank arms 818A, 818B and other components of the counterbalance mechanism 816 are configured to be located behind the display 804 mounted to the front surface 807 of the circular rail 802.

The first crank arm 818A is rotatably coupled via pin 820A to an arm 821A that extends inwardly from the circular rail 802. Similarly, on an opposite side of circular rail 802 the second crank arm 818B is rotatably coupled via pin 820B to an arm 821B that extends inwardly from the rail. With this configuration, as the rail 802 and attached display 804 rotate relative to the chassis 810, the first crank arm 818A and second crank arm 818B may pivot about their respective pins 820A and 820B.

The counterbalance mechanism 816 further comprises a first connecting link 822A and a second connecting link 822B. The first connecting link 822A has a first portion 824A that is rotatably connected to a link end 826A of the first crank arm 818A. In a similar manner, the second connecting link 822B has a first portion 824B that is connected to a link end 826B of the second crank arm 818B. Each of the first connecting link 822A and the second connecting link 822B also has a second portion 828A and a second portion 828B, respectively. The second portion 828A of the first connecting link 822A and the second portion 828B of the second connecting link 822B are each connected to the chassis 810 via a plate 811 fixedly mounted to the chassis.

Each of the first mechanism 816A and the second mechanism 816B also includes at least one spring. In this example the first mechanism 816A comprises a first set of springs 830A and the second mechanism 816B comprises a second set of springs 830B. In other examples, the first mechanism 816A and the second mechanism 816B each comprise a single spring. Each spring in the first set of springs 830A comprises a first end connected to a spring end 834A of the crank arm 818A. A second end of each of the first set of springs 830A is connected to an arm 837A extending inwardly from the circular rail 802. In a similar manner, each spring in the second set of springs 830B comprises a first end connected to a spring end 834B of the crank arm 818B. A second end of each of the second set of springs 830B is connected to an arm 837B extending inwardly from the circular rail 802.

In this manner and with this configuration, a clockwise rotation of the display 804 and circular rail 802 about the center of rotation 844 results in counterclockwise rotation of the first crank arm 818A and the second crank arm 818B about their respective pins. Accordingly, such clockwise rotation of the display 804 results in extension of the first set of springs 830A and the second set of springs 830B. In this manner, the counterbalance mechanism 816 generates a counterclockwise torque via connecting links 822A and 822B that opposes the gravitational torque urging the display 804 to fall into the portrait orientation.

As with the other examples of counterbalance mechanisms described above, counterbalance mechanism 816 may also weigh less than systems using counterweight(s) to counteract gravitational forces. The counterbalance mechanism 816 may also occupy less space within the display assembly 800 than other configurations. In some examples, the counterbalance mechanism 816 may be configured to occupy a smaller footprint and to position the spring(s) 830A and 830B where they have a suitable amount of room to extend within the display assembly 800. The counterbalance mechanism 816 also enables the torque profile of the display assembly 800 to be tuned to provide a desirable amount of resistance for a pleasing user experience. For example, in this configuration the dual counterbalance mechanisms 816A and 816B may enable fine control and tuning of the torque profile, with each mechanism being individually adjustable to tune the torque profile as desired.

Figure 11:
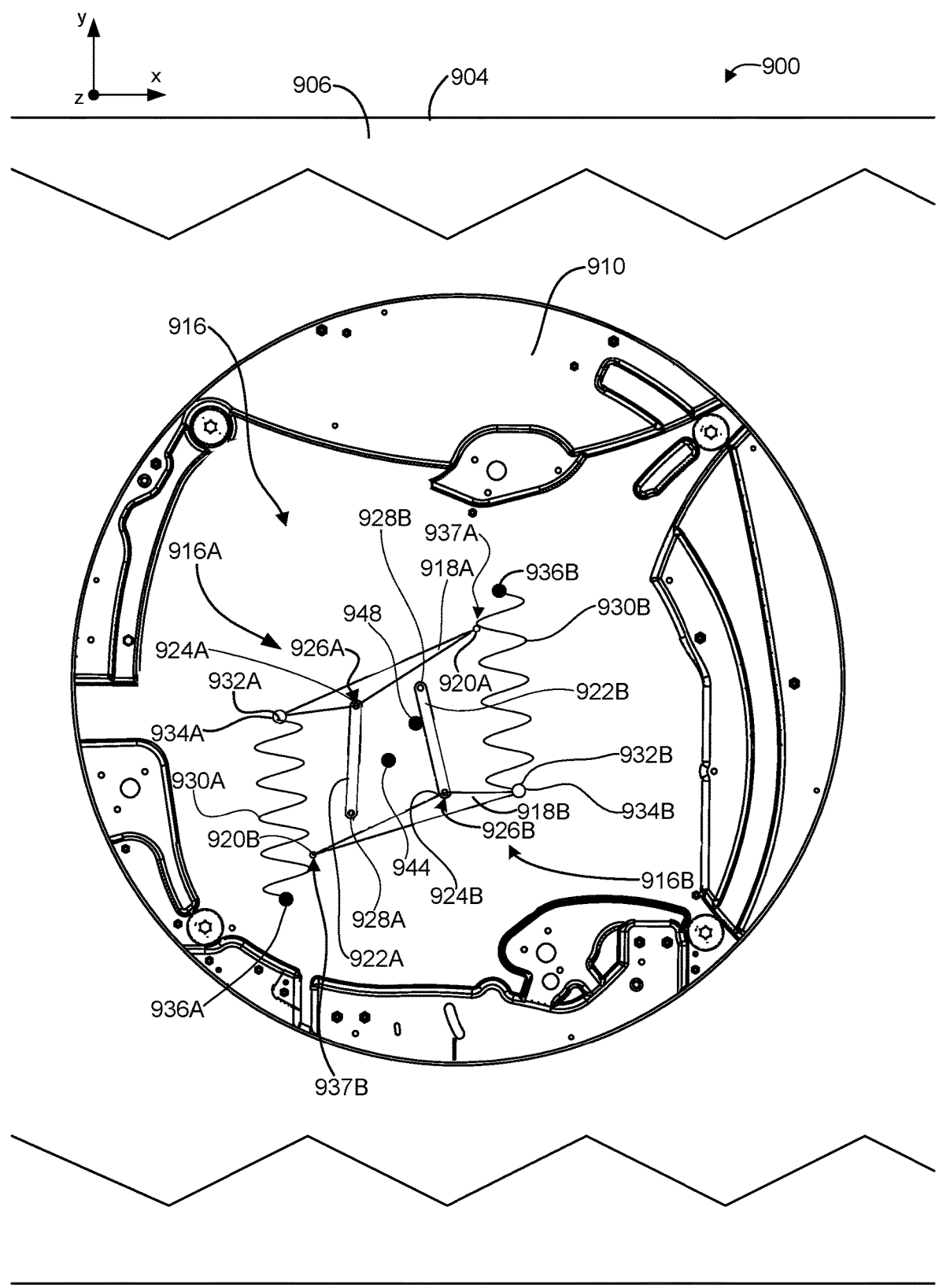
FIG. 11 shows a simplified cutaway view of another example of a counterbalance mechanism in a landscape orientation according to examples of the present disclosure.
Figure 12:
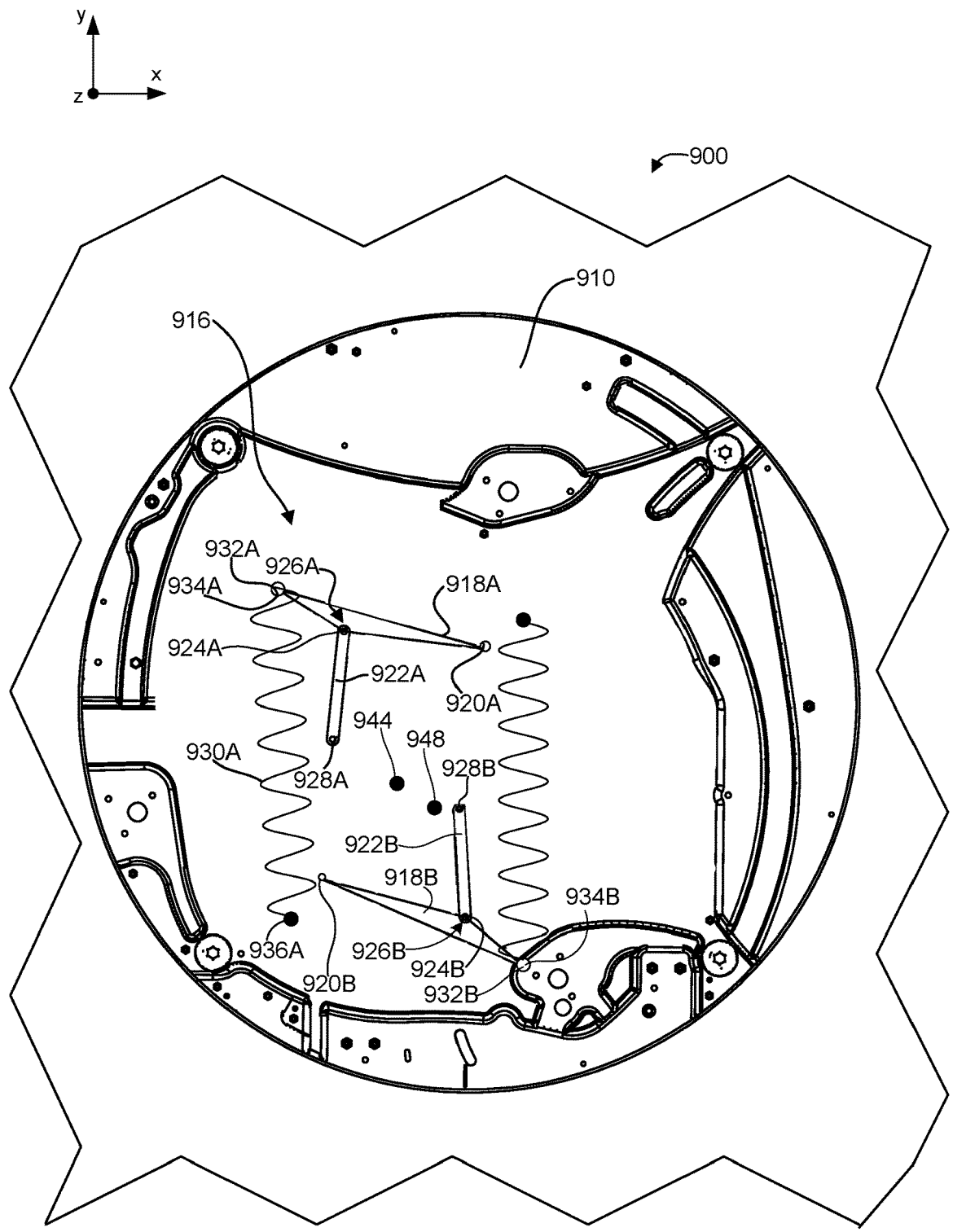
FIG. 12 shows a cutaway view of the counterbalance mechanism of FIG. 11 in a portrait orientation according to examples of the present disclosure.

FIGS. 11 and 12 illustrate another configuration of a counterbalance mechanism 916 for a rotatable display assembly 900. In this example, each crank arm is rotatably coupled to the ground at an end of the crank arm, and each connecting link is rotatably coupled to its crank arm between the corresponding spring and the ground coupling. As shown in FIG. 11, the display assembly 900 is depicted in a cutaway view through a front side 906 of the display 904. The display assembly 900 is viewed from the positive z-axis looking towards the negative z-axis. In this example the display 904 is in a landscape orientation and rotates about a center of rotation 944 that is offset from a center of mass 948.

In the configuration of FIG. 11, the counterbalance mechanism 916 includes a first counterbalance mechanism 916A and a second counterbalance mechanism 916B. The first counterbalance mechanism 916A and the second counterbalance mechanism 916B are located on opposite sides of the center of rotation 944 of the display 904. The counterbalance mechanism 916 includes a first crank arm 918A and a second crank arm 918B. Each of the first crank arm 918A and the second crank arm 918B is located at a z-axis position between the display 904 and mounting assembly 910. The mounting assembly 910 may be analogous to the mounting assembly 210 of FIGS. 2-4. In the example of FIG. 11, each of the first crank arm 918A and the second crank arm 918B rotates in a plane parallel to the X-Y plane in which the display 904 rotates.

Each of the first crank arm 918A and the second crank arm 918B is rotatably coupled to a ground at an end of the crank arm. In the example of FIG. 11, a pivoting end of the crank arm 918A is rotatably coupled to an underlying plate of the mounting assembly 910 via a pin 920A extending from the underlying plate. Similarly, a pivoting end of the crank arm 916B is rotatably coupled to the underlying plate via a pin 920B extending from the underlying plate.

The counterbalance mechanism 916 further comprises a first connecting link 922A and a second connecting link 922B. The first connecting link 922A has a first portion 924A that is rotatably connected to an intermediate point 926A of the first crank arm 918A between a spring end 934A an opposite pivoting end 937A of the first crank arm. In a similar manner, the second connecting link 922B has a first portion 924B that is rotatably connected to an intermediate point 926B of the second crank arm 918B between a spring end 934B an opposite pivoting end 937B of the second crank arm. Each of the first connecting link 922A and the second connecting link 922B also has a second portion 928A and 928B, respectively, that is connected to the display 904.

Each of the first mechanism 916A and the second mechanism 916B also includes at least one spring. In the example of FIGS. 11 and 12, the first mechanism 916A utilizes a single spring 930A and the second mechanism 916B utilizes a single spring 930B. In different examples, the first mechanism 916A and the second mechanism 916B may utilize multiple springs or spring elements.

The spring 930A comprises a first end 932A connected to a spring end 934A of the crank arm 918A. A second end 936A of spring 930A is connected to the ground (e.g. to the mounting assembly 910). In a similar manner, the spring 930B comprises a first end 932B connected to a spring end 934B of the crank arm 918B, and a second end 936B connected to the mounting assembly 910. In this manner, the counterbalance mechanism 916 is configured to couple extension of spring 930A and spring 930B to the rotation of the display 904. With this configuration and as seen in FIGS. 11 and 12, rotation of the display 904 in a clockwise direction causes the second portion 928A of the first connecting link 922A to move upwardly with the display, and the second portion 928B of the second connecting link 922B to move downwardly with the display. Such motion of the connecting links 922A and 922B causes corresponding movement of the connected crank arms 918A and 918B, which cause extension of both springs 930A and 930B.

FIG. 12 shows the display assembly of FIG. 11 rotated clockwise 90 degrees into a portrait orientation. Correspondingly, second portion 928A of the first connecting link 922A has moved upwardly and the second portion 928B of the second connecting link 922B has moved downwardly. This movement correspondingly causes the springs 930A and 930B to extend along the y-axis and exert opposing y-axis force on the spring ends 934A and 934B of the crank arms 918A and 918B, respectively. In this manner, the counterbalance mechanism 916 is configured to resist forces encouraging the display 904 to fall into the portrait orientation.

As with the counterbalance mechanism 216 described above, counterbalance mechanism 916 may also provide other advantages over other systems. For example, the counterbalance mechanism 916 may weigh less than systems using counterweight(s) to counteract the gravitational forces. The counterbalance mechanism 916 may also occupy less space within the display assembly 900 than other configurations. In some examples, the counterbalance mechanism 916 may be configured to occupy a smaller footprint and to position the spring(s) 930A and 930B where they may have a suitable amount of room to extend within the display assembly 900. The counterbalance mechanism 916 also enables the torque profile of the display assembly 900 to be tuned to provide a desirable amount of resistance for a pleasing user experience. For example, in this configuration the dual counterbalance mechanisms 916A and 916B may enable precise control and tuning of the torque profile, with each mechanism being individually adjustable to vary the torque profile as desired.

The following paragraphs provide additional support for the claims of the subject application. One aspect provides a counterbalance mechanism for a rotatable display, the counterbalance mechanism comprising: at least one crank arm rotatably connected to a ground; at least one spring comprising a first end connected to a spring end of the at least one crank arm, and a second end connected to the ground; and at least one connecting link having a first portion connected to the at least one crank arm and a second portion connected to the rotatable display. The counterbalance mechanism may additionally or alternatively include, wherein a center of mass of the rotatable display is offset from a center of rotation of the rotatable display. The counterbalance mechanism may additionally or alternatively include, wherein the at least one crank arm is one crank arm, the at least one spring is one spring, and the at least one connecting link is one connecting link. The counterbalance mechanism may additionally or alternatively include, wherein the at least one crank arm comprises two crank arms, the at least one spring comprises two springs, and the at least one connecting link comprises two connecting links. The counterbalance mechanism may additionally or alternatively include, wherein a center of rotation of the rotatable display is substantially between a first crank arm and a second crank arm. The counterbalance mechanism may additionally or alternatively include, wherein the at least one spring is configured to oppose rotation of the rotatable display from a landscape orientation into a portrait orientation. The counterbalance mechanism may additionally or alternatively include, wherein the at least one crank arm is rotatably connected to the ground at a point substantially at an end of the at least one crank arm. The counterbalance mechanism may additionally or alternatively include, wherein the at least one crank arm is rotatably connected to the ground at a point between two ends of the at least one crank arm. The counterbalance mechanism may additionally or alternatively include, wherein the first portion of the at least one connecting link is connected to a link end of the at least one crank arm. The counterbalance mechanism may additionally or alternatively include, wherein the first portion of the at least one connecting link is connected to a point between the spring end and a link end of the at least one crank arm.

Another aspect provides counterbalance mechanism for a rotatable display, the counterbalance mechanism comprising: at least one crank arm rotatably connected to the rotatable display; at least one spring comprising a first end connected to a spring end of the at least one crank arm, and a second end connected to the rotatable display; and at least one connecting link having a first portion connected to the at least one crank arm and a second portion connected to a ground. The counterbalance mechanism may additionally or alternatively include, wherein a center of mass of the rotatable display is offset from a center of rotation of the rotatable display. The counterbalance mechanism may additionally or alternatively include, wherein the at least one spring is configured to oppose rotation of the rotatable display from a landscape orientation into a portrait orientation. The counterbalance mechanism may additionally or alternatively include, wherein the at least one crank arm is rotatably connected to the rotatable display at a point between two ends of the at least one crank arm. The counterbalance mechanism may additionally or alternatively include, wherein the first portion of the at least one connecting link is connected to a link end of the at least one crank arm. The counterbalance mechanism may additionally or alternatively include, wherein the second portion of the at least one connecting link is rotatably connected to the ground. The counterbalance mechanism may additionally or alternatively include, wherein the at least one crank arm is rotatably connected to the rotatable display between the at least one connecting link and the at least one spring. The counterbalance mechanism may additionally or alternatively include, wherein the at least one crank arm comprises two crank arms, the at least one spring comprises two springs, and the at least one connecting link comprises two connecting links.

Another aspect provides display assembly, comprising: a mounting assembly; a display rotatably coupled to the mounting assembly; and a counterbalance mechanism comprising, at least one crank arm rotatably connected to the mounting assembly, at least one spring comprising a first end connected to a spring end of the at least one crank arm, and a second end connected to the mounting assembly, and at least one connecting link having a first portion connected to the at least one crank arm and a second portion connected to the display. The display assembly may additionally or alternatively include, wherein a center of mass of the display is offset from a center of rotation of the display As used herein, the phrase "and/or" means any or all of multiple stated possibilities.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A counterbalance mechanism for a rotatable display, the counterbalance mechanism comprising:
   at least one crank arm rotatably connected to a ground at a location on the crank arm that is not linearly slidable relative to the ground;
   at least one spring comprising a first end connected to a spring end of the at least one crank arm, and a second end connected to the ground; and at least one connecting link having a first portion connected to the at least one crank arm and a second portion connected to the rotatable display, wherein the first portion of the at least one connecting link is connected to a point between the spring end and a link end of the at least one crank arm.

2. The counterbalance mechanism of claim 1, wherein a center of mass of the rotatable display is offset from a center of rotation of the rotatable display.

3. The counterbalance mechanism of claim 1, wherein the at least one crank arm comprises two crank arms, the at least one spring comprises two springs, and the at least one connecting link comprises two connecting links.

4. The counterbalance mechanism of claim 3, wherein a center of rotation of the rotatable display is substantially between a first crank arm and a second crank arm.

5. The counterbalance mechanism of claim 1, wherein the at least one spring is configured to oppose rotation of the rotatable display from a landscape orientation into a portrait orientation.

6. The counterbalance mechanism of claim 1, wherein the at least one crank arm is rotatably connected to the ground at a point substantially at an end of the at least one crank arm.

7. A counterbalance mechanism for a rotatable display, the counterbalance mechanism comprising:
at least one crank arm rotatably connected to the rotatable display at a location on the crank arm that is not linearly slidable relative to the rotatable display;
at least one spring comprising a first end connected to a spring end of the at least one crank arm, and a second end connected to the rotatable display; and
at least one connecting link having a first portion connected to the at least one crank arm and a second portion connected to a ground,
wherein the at least one crank arm is rotatably connected to the rotatable display at a point between two ends of the at least one crank arm.

8. The counterbalance mechanism of claim 7, wherein a center of mass of the rotatable display is offset from a center of rotation of the rotatable display.

9. The counterbalance mechanism of claim 7, wherein the at least one spring is configured to oppose rotation of the rotatable display from a landscape orientation into a portrait orientation.

10. The counterbalance mechanism of claim 7, wherein the first portion of the at least one connecting link is connected to a link end of the at least one crank arm.

11. The counterbalance mechanism of claim 7, wherein the second portion of the at least one connecting link is rotatably connected to the ground.

12. The counterbalance mechanism of claim 7, wherein the at least one crank arm is rotatably connected to the rotatable display between the at least one connecting link and the at least one spring.

13. The counterbalance mechanism of claim 7, wherein the at least one crank arm comprises two crank arms, the at least one spring comprises two springs, and the at least one connecting link comprises two connecting links.

14. The counterbalance mechanism of claim 7, wherein the at least one spring is configured to oppose rotation of the rotatable display from a landscape orientation into a portrait orientation.

15. A display assembly, comprising:
a mounting assembly;
a display rotatably coupled to the mounting assembly; and
a counterbalance mechanism comprising,
at least one crank arm rotatably connected to the mounting assembly at a location on the crank arm that is not linearly slidable relative to the mounting assembly,
at least one spring comprising a first end connected to a spring end of the at least one crank arm, and a second end connected to the mounting assembly, and
at least one connecting link having a first portion connected to the at least one crank arm and a second portion connected to the display,
wherein the at least one crank arm is rotatably connected to the rotatable display at a point between two ends of the at least one crank arm.

16. The display assembly of claim 15, wherein a center of mass of the display is offset from a center of rotation of the display.

17. The display assembly of claim 15, wherein the at least one crank arm comprises two crank arms, the at least one spring comprises two springs, and the at least one connecting link comprises two connecting links.

18. The display assembly of claim 17, wherein a center of rotation of the rotatable display is substantially between a first crank arm and a second crank arm.

19. The counterbalance mechanism of claim 15, wherein the at least one spring is configured to oppose rotation of the rotatable display from a landscape orientation into a portrait orientation.

* * * * *